(12) United States Patent
Simu

(10) Patent No.: US 7,376,750 B1
(45) Date of Patent: May 20, 2008

(54) METHOD AND APPARATUS FOR GENERIC APPLICATION LAYER GATEWAY

(75) Inventor: Adina F. Simu, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 629 days.

(21) Appl. No.: 10/263,888

(22) Filed: Oct. 2, 2002

(51) Int. Cl.
G06F 15/16 (2006.01)

(52) U.S. Cl. ............... 709/245; 709/227; 709/229; 709/230; 370/465; 370/466

(58) Field of Classification Search ........... 709/217, 709/219, 227, 229, 230, 245, 226; 726/15
See application file for complete search history.

(56) References Cited

U.S. PATENT DOCUMENTS 6,886,103 B1 * 4/2005 Brustoloni et al. ......... 726/15

2002/0138622 A1 * 9/2002 Dorenbosch et al. ....... 709/227

OTHER PUBLICATIONS

Communication Network (Fundamental Concepts and Key Architectures), Second Edition by Alberto Leon-Garcia (see chapter 8).*
"A SIP Application Level Gateway for Network Address Translation", B. Biggs, 3COM, Mar. 2000, Internet Draft, 8 pages.

* cited by examiner

Primary Examiner—Yves Dalencourt
(74) Attorney, Agent, or Firm—Weaver Austin Villeneuve & Sampson LLP

(57) ABSTRACT

Methods and apparatuses for a generic application layer gateway. By systematically examining each field in a message, tokens can be found that are likely to represent an IP address. Translation of those tokens can then be attempted. Certain fields that do not require translation are excluded from the process.

15 Claims, 3 Drawing Sheets

METHOD AND APPARATUS FOR GENERIC APPLICATION LAYER GATEWAY

BACKGROUND OF THE INVENTION

1. Field of the Invention

The present invention relates generally to the translation of addresses across networks and more specifically to application layer gateways.

2. Description of the Related Art

Machines must have unique addresses if they are to communicate with each other over a network, such as the Internet. IPv4, the current version of the Internet protocol, provides 32 bits for the IP address. Although 32 bits theoretically allows 4,294,967,296 unique IP addresses, addresses are separated into classes and set aside for multicasting, testing and other special uses. The actual number of available addresses from Network Solutions, Inc., the entity that provides registration services for the Internet, are between 3.2 and 3.3 billion. With the explosion of the Internet, address depletion is a serious concern. Additionally, many enterprises want to manage their own networks, and do not want to rely on Network Solutions, Inc. for the addressing of every machine on their networks.

One solution for conserving addresses is referred to as network address translation (NAT). NAT allows an intermediary device (e.g., computer, router or switch) to act as an agent between a public network (e.g., the Internet) and a private local network. Each device on the local network is assigned a local IP address that is used only for local communications. Additionally, the local network is given a range of public IP addresses to represent the devices on the local network when communicating with the public network.

When a local computer attempts to communicate with a computer outside the local network, the intermediary device (NAT box) maps the local computer's IP address to one of the public network's IP addresses and replaces the local computer's address with public network's IP address. If the local network has more devices than public IP addresses, the public IP addresses must be shared among the local computers.

A feature of IP is multiplexing, which allows a computer to maintain several concurrent connections with remote computers using different TCP or UDP ports. A NAT box takes advantage of this feature by modifying the TCP/UDP ports for the traffic from the local computers such that it can uniquely map the local address and local TCP/UDP port number (tuple) to the public IP address and assigned TCP/UDP port number. Therefore, when a NAT box uses network address port translation (NAPT), it does not need the same number of public addresses as local devices. It should be noted that NAPT is included in the definition of NAT.

In addition, particular applications (e.g., DNS (domain name service), FTP (file transfer protocol), H.225/H.245) may embed IP addresses and/or TCP/UDP ports in the payload for various application specific purposes. NAT boxes are given application-specific knowledge in order to translate such addresses, as described in the Internet Engineering Task Force's RFC 2663, "IP Network Address Translator (NAT) Terminology and Considerations," by P. Srisuresh and M. Holdrege (August 1999), incorporated herein by reference in its entirety and for all purposes.

SUMMARY OF THE INVENTION

The present invention provides methods and apparatuses for generic application layer gateway translation. A NAT box first receives a message and determines whether the message is appropriate for generic application layer gateway translation. If generic application layer translation processing is appropriate, the NAT box will perform various operations on each field in the message.

Specifically, the NAT box will first examine the message field in order to determine whether special treatment is necessary. Special treatment might require skipping the field or special translation rules. If no special treatment is required, the NAT box will identify tokens that are likely to be representative of an address and attempt to translate those identified tokens.

DETAILED DESCRIPTION OF THE PREFERRED EMBODIMENTS

In the following description, numerous specific details are set forth to provide a thorough understanding of the present invention. However, it will be obvious to one skilled in the art that the present invention may be practiced without some or all of these specific details. In other instances, well known process steps have not been described in detail in order to avoid unnecessarily obscuring the present invention. For example, the present invention may include mechanisms for logging an error if a private address has no defined binding or rule set and there are no more available public addresses in the NAT device's pool for translation. Several typical procedures that may be performed on data along with translating the data and/or sending it to its destination are described further in U.S. Pat. No. 5,793,763 by Mayes et al., issued Aug. 11, 1998, incorporated herein by reference in its entirety and for all purposes.

Figure 1:
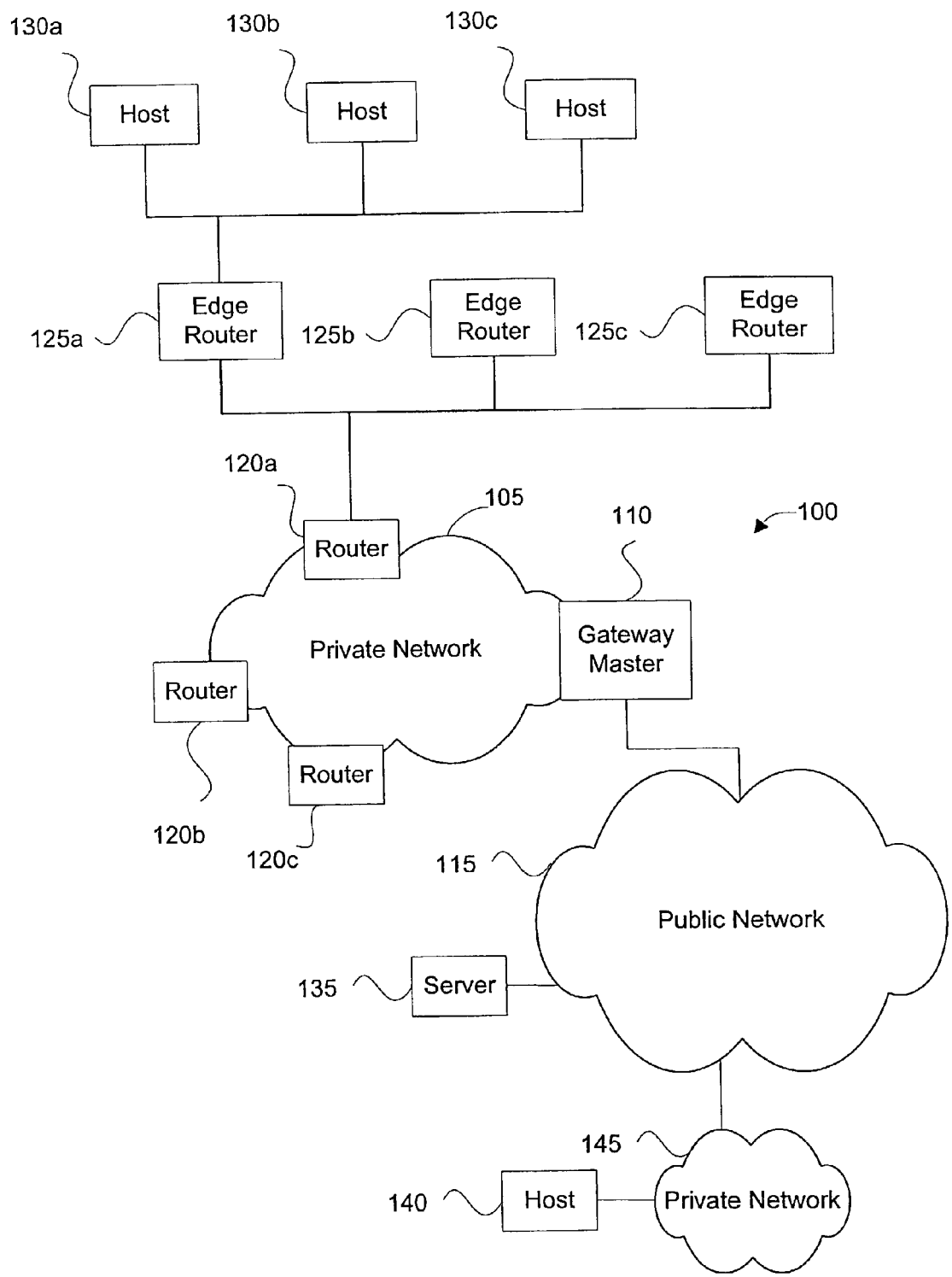
FIG. 1 is a block diagram illustrating an exemplary environment in which the present invention may be implemented.

FIG. 1 is a block diagram illustrating an exemplary environment in which the present invention may be implemented. A private network 105, such as an Internet Service Provider (ISP) is coupled with a NAT box 110, which allows connectivity with a public network 115, such as the Internet. The private network 105 includes a plurality of intermediary hubs 120a, 120b and 120c, such as aggregators that provide connectivity for a plurality of edge routers 125a, 125b and 125c. The edge routers 125a, 125b and 125c may be in the form of customer premises equipment (CPE), such as a cable modem, which may be coupled to one or more hosts 130a, 130b and 130c, such as PCs. Although only one intermediary router 125a is shown as being an aggregator (having an associated network segment of CPEs and PCs), multiple intermediary routers might be aggregators. For simplicity, the following discussion will focus on aggregators, CPEs and PCs. However, it should be understood that the invention is not limited to aggregators, CPEs and PCs.

Network addresses (e.g., IP addresses) used by devices of the public network 115 are referred to as "outside" addresses with respect to the NAT box 110. Outside addresses may include addresses associated with devices directly connected to the public network 115, such as a web server 135 or devices on other private networks, such as correspondent host 140 connected to a correspondent network 145. Network addresses associated with devices 130a, 130b and 130c of the private network 105 are referred to as "inside" addresses with respect to the NAT box 110.

Although each address is unique within its network, the inside addresses of the ISP's local network 105, the correspondent network 145 and the public network 115 may include addresses that overlap with each other. To avoid addressing collisions, addresses that are unique within the private network 105 should be translated to addresses that are unique within the public network 115. The address translations from one network are generally invisible to another network.

Address translations frequently include application specific embedded payload inspection and modification of such payload in addition to standard header translation. Usually, all instances of either the source or the destination IP address are translated, regardless of where the addresses appear in a packet. Application layer gateways (ALGs) are specialized programs that support packet translation of specific protocols or applications. ALGs can be implemented any number of ways, including those described in U.S. patent application Ser. No. 10/125,300, filed April 17, and titled, "Method And Apparatus For Indicating Network Address Translation (NAT) Topology Information To A Nat Device That Is Phsyically Separate From An Application Layer Gateway (ALG) Device," incorporated herein by reference in its entirety and for all purposes.

In order to support both older and newer versions of a protocol or application that requires translation, ALGs are typically kept current and are backwards compatible. Keeping ALGs current is, however, costly and sometimes impossible with protocols that are in flux or has not reached a permanent state.

Session Initiation Protocol (SIP) is one example of a protocol that is in flux. SIP is used for such applications as Internet conferencing, telephony, presence, events notification and instant messaging. These applications are not yet standardized, and different providers use different methods to connect over the Internet. Although SIP generally defines call setup, routing, and authentication (see RFC 3261 of the Network Working Group, J. Rosenberg, et al., June 2002, incorporated herein by reference in its entirety and for all purposes), application providers might use nonstandard techniques to accomplish their goals.

Figure 2:
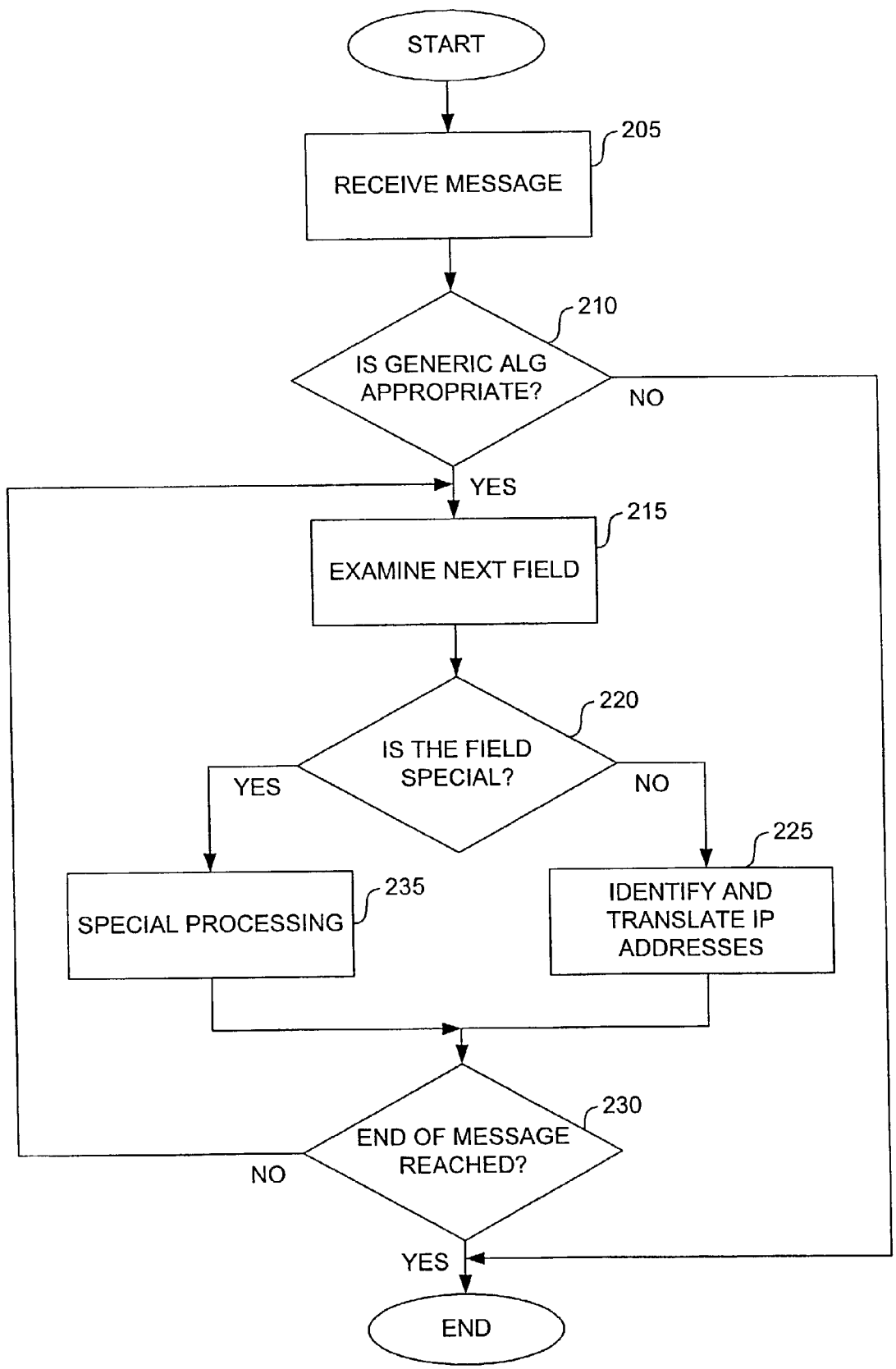
FIG. 2 is a block diagram of an arbitrary network topology of routers in which host route injection may be used.

FIG. 2 is a flowchart of one embodiment of a generic ALG in accordance with one embodiment of the present invention. In step 205 a message is first received by the NAT box 110 that is destined for an outside device. In step 210 the NAT box determines whether the generic ALG is appropriate (e.g., whether the generic ALG should be implemented on the received message).

As will be seen, whether the generic ALG is appropriate depends upon whether a lexical analyzer is capable of recognizing IP addresses. Fundamentally, this requires the lexical analyzer to be capable of analyzing the lexicon of the packet. Without understanding what the 1s and 0s mean, the generic ALG would not be capable of locating an inside address within the packet and translating the inside address to an outside address.

Text-based protocols, such as SIP are therefore well suited to the generic ALG. Since SIP uses regular ASCII notation, the generic ALG can easily read the information in the packet. Usually, the generic ALG would know that a packet was using SIP because it would use 5060 as a source and destination port (or some other port if the NAT box 110 was so configured). Similarly, Media Gateway Control Protocol (MGCP), described in RFC 2705, incorporated herein by reference for all purposes, is also a text-based protocol that can use the generic ALG.

Once a NAT box 110 determines that a generic ALG is appropriate, it starts examining the first field in step 215. SIP header fields could include "FROM," "TO," "CALL-ID," "USER-AGENT," "CONTACT," etc. SIP body fields could include the "V-FIELD," the "O-FIELD," "P-FIELD," etc.

Once the type of field is determined, the process proceeds to step 220. In step 220 the NAT box determines whether the field requires special treatment. If the field is not one of the special fields, the process proceeds to step 225 where IP addresses are identified and translated.

An IPv4 address is represented as either "A.B.C.D" or "A.B.C.D:E" where A, B, C and D are all numbers the range of 0 to 255 and E is a number in the range of 0 to 65535. The lexical analyzer would, therefore, preferably be set up to detect tokens within a field in the form of A.B.C.D or A.B.C.D:E where A, B, C and D are all numbers of one to three digits in length and E is a number from one to five digits in length. Although the lexical could be further refined to detect numbers of less than 255 (or 65535), such refinement would usually not be necessary because the number of "false positives" (tokens that are not actually addresses) would be small.

Similar standard notations are used for IPv6 addresses. Specifically, IPv6 addresses are represented as G:H:I:J:K:L:M:N where G, H, I, J, K, L, M and N are 16-bit hexadecimal words in the range of 0 to FFFF. Additionally, IPv6 can use compressed notation when multiple zeros are present. Compressed notation allows a double semicolon (::) to represent multiple zeros, so an address such as 0:0:0:0:0:FF12:CA:334D could be represented as ::FF12:CA:334D. IPv6 can also be combined with IPv4 notation, so that the IPv4 address is appended to the end of an IPv6 address. Because of the flexibility in IPv6 addresses, the lexical analyzer would require more complexity to detect tokens that have a likelihood of being an IPv6 address.

Once the lexical analyzer detects a token that represents an IP address, the NAT box 110 attempts to translate the inside IP address into an appropriate outside IP address. Translation can be accomplished through traditional table lookup or any other appropriate mechanism. If no translation is possible (e.g., no entry was found), the system can assume that it misidentified a token as an IP address, and would simply ignore the entry.

The process then proceeds to step 230. If the end of the message was reached, the process stops and no further translation is required. Otherwise, the process would repeat itself with step 215, examining the next field for translation.

Once the field is identified, the process proceeds again to step 220 where a determination is made as to whether the field is special. In the header, the CALL-ID and the CONTACT fields would both be considered special. In the body, only the O-FIELD would require special processing.

Both the CALL-ID field and the O-FIELD do not require any translation because the IP addresses are used solely for identification purposes. Therefore, the NAT box 110 would simply skip those fields and proceed to the next process step 230. The CONTACT field, however, would require a special translation to be installed on the NAT box 110, which allows any host/server located on the outside to contact (i.e., initiate an O-connection) to the inside host identified in the CONTACT field.

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the NAT box may be implemented in specially configured routers, switches or servers, such as specially configured router models 8xx, 17xx, 4xxx, 7xxx, etc. available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 3:
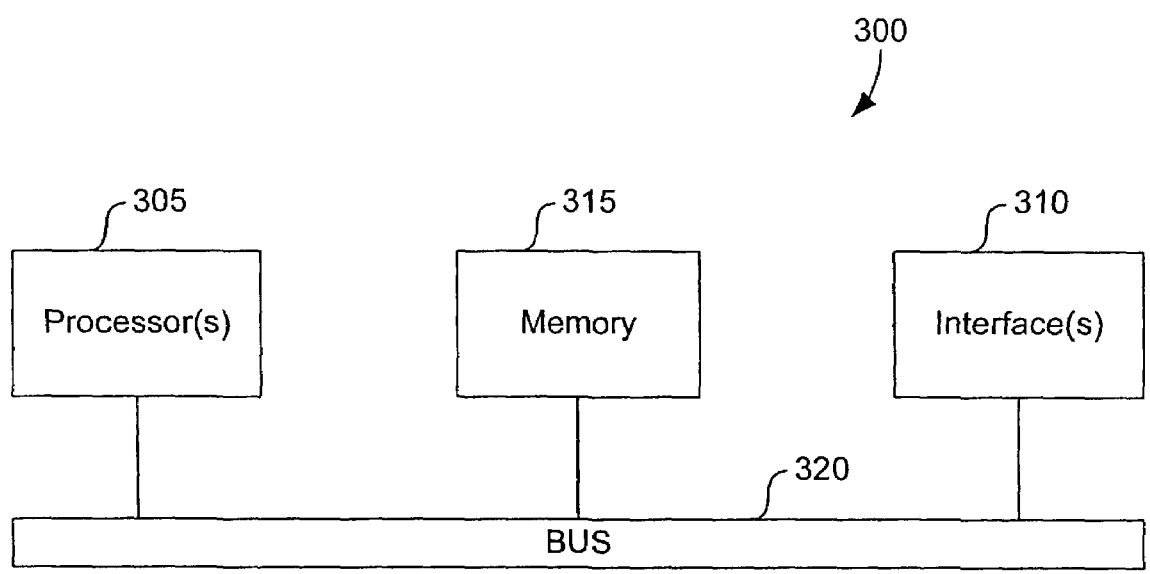
FIG. 3 is a diagram illustrating an exemplary network device in which various embodiments of the invention may be implemented.

Referring now to FIG. 3, a network device 300 suitable for implementing the techniques of the present invention includes a master central processing unit (CPU) 305, interfaces 310, memory 315 and a bus 320. When acting under the control of appropriate software or firmware, the CPU 305 may be responsible for implementing specific functions associated with the functions of a desired network device. For example, when configured as an intermediate router, the CPU 305 may be responsible for analyzing packets, encapsulating packets, and forwarding packets for transmission to a set-top box. The CPU 305 preferably accomplishes all these functions under the control of software including an operating system (e.g. Windows NT), and any appropriate applications software.

CPU 305 may include one or more processors such as those from the Motorola family of microprocessors or the MIPS family of microprocessors. In an alternative embodiment, the processor is specially designed hardware for controlling the operations of network device 300.

The interfaces 310 are typically provided as interface cards (sometimes referred to as "line cards"). Generally, they control the sending and receiving of data packets over the network and sometimes support other peripherals used with the network device 300. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the CPU 305 to efficiently perform routing computations, network diagnostics, security functions, etc.

Although the system shown in FIG. 3 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, the memory 315) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

What is claimed is:

1. A method of performing generic application layer gateway translation comprising:
  receiving a message having multiple fields;
  determining whether the message is appropriate for generic application layer gateway translation; and
  if the message is appropriate for generic application layer gateway translation, for each of the multiple fields:
    if the each field does not require special treatment, examining, without knowledge of which field contains an address, the format of such each field so as to determine whether the examined format matches a known address format; and
    if the examined format has been determined to match a known address format, performing an address translation on the each field.

2. The method of claim 1 wherein:
the multiple fields include both the header and the payload.

3. The method of claim 1 wherein:
wherein the known address format is A.B.C.D, where A, B, C and D are numbers having values in the range of 0 to 255.

4. The method of claim 1 wherein:
wherein the known address format is A.B.C.D:E, where A, B, C and D are numbers having values in the range of 0 to 255 and E is a number having a value in the range of 0 to 65535.

5. The method of claim 1 wherein:
determining whether the message is appropriate for generic application layer gateway translation is a determination of whether the message is using Session Initiation Protocol.

6. The method of claim 5 wherein;
the determination of whether the field requires special treatment is a determination of whether the field is a CALL-ID field or a CONTACT field.

7. The method of claim 1 wherein the method is stored as instructions on a computer-readable storage medium.

8. A network address translation (NAT) device comprising:
a processor;
a memory, operably connected with the processor; and
a network interface, operably connected with the processor;
wherein the processor is operable to perform instructions including
receiving a message having multiple fields;
determining whether the message is appropriate for generic application layer gateway translation; and
if the message is appropriate for generic application layer gateway translation, for each of the multiple fields:
if the each field does not require special treatment, examining, without knowledge of which field contains an address, the format of such each field so as to determine whether the examined format matches a known address format; and
if the examined format has been determined to match a known address format, performing an address translation on the each field.

9. The NAT device of claim 8 wherein:
the multiple fields include both the header and the payload.

10. The NAT device of claim 8 wherein:
wherein the known address format is A.B.C.D, where A, B, C and D are numbers having values in the range of 0 to 255.

11. The NAT device of claim 8 wherein:
wherein the known address format is A.B.C.D:E, where A, B, C and D are numbers having values in the range of 0 to 255 and E is a number having a value in the range of 0 to 65535.

12. The NAT device of claim 8 wherein:
determining whether the message is appropriate for generic application layer gateway translation is a determination of whether the message is using Session Initiation Protocol.

13. The NAT device of claim 12 wherein:
the determination of whether the field requires special treatment is a determination of whether the field is a CALL-ID field or a CONTACT field.

14. A network address translation (NAT) device comprising:
a means for receiving a message having multiple fields;
a means for determining whether the message is appropriate for generic application layer gateway translation; and
a means for if the message is appropriate for generic application layer gateway translation, for each of the multiple fields:
if the each field does not require special treatment, examining, without knowledge of which field contains an address, the format of such each field so as to determine whether the examined format matches a known address format; and
if the examined format has been determined to match a known address format, performing an address translation on the each field.

15. A computer-readable storage medium, in the form of magnetic media and/or magneto-optical media, storing thereon computer-readable instructions for performing generic application layer gateway translation comprising:
instructions for receiving a message having multiple fields;
instructions for determining whether the message is appropriate for generic application layer gateway translation; and
instructions for performing the following operations, if the message is appropriate for generic application layer gateway translation, for each of the multiple fields:
if the each field does not require special treatment, examining, without knowledge of which field contains an address, the format of such each field so as to determine whether the examined format matches a known address format; and
if the examined format has been determined to match a known address format, performing address translation on the each field.

* * * * *